(12) United States Patent
Nelson et al.

(10) Patent No.: US 7,813,331 B2
(45) Date of Patent: Oct. 12, 2010

(54) APPARATUS, SYSTEM, AND METHOD FOR IMPLEMENTING FAILOVER IN A POLLING ADAPTER WITHOUT SUPPORT FROM AN APPLICATION SERVER

(75) Inventors: Travis E. Nelson, San Jose, CA (US); Suraksha Vidyarthi, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 11/846,440

(22) Filed: Aug. 28, 2007

(65) Prior Publication Data

US 2009/0059888 A1    Mar. 5, 2009

(51) Int. Cl.
*H04J 3/16* (2006.01)
(52) U.S. Cl. ...................................... 370/346; 711/114
(58) Field of Classification Search .................. 370/346
See application file for complete search history.

(56) References Cited

U.S. PATENT DOCUMENTS

2002/0188711 A1* 12/2002 Meyer et al. ................. 709/223
2005/0228947 A1* 10/2005 Morita et al. ................ 711/114

* cited by examiner

*Primary Examiner*—Jason E Mattis
*Assistant Examiner*—Stephen J Clawson
(74) *Attorney, Agent, or Firm*—Kunzler Needham Massey & Thorpe

(57) ABSTRACT

An apparatus, system, and method are disclosed for implementing failover in a polling adapter without support from an application server. A priority list is stored as part of an adapter configuration that specifies the server names that will participate in a group cluster. Adapters associated with the servers, in addition to accessing the event table when active, access a failover table which contains information about which adapter is currently active and when it last polled the event table. When a preconfigured failover interval has elapsed since the last poll of the event table by the active adapter, a next highest priority takes over the processing duties by polling the event table and logging its last poll time in the failover table.

6 Claims, 3 Drawing Sheets

APPARATUS, SYSTEM, AND METHOD FOR IMPLEMENTING FAILOVER IN A POLLING ADAPTER WITHOUT SUPPORT FROM AN APPLICATION SERVER

BACKGROUND OF THE INVENTION

1. Field of the Invention

This invention relates to failover in a polling adapter and more particularly relates to failover in a polling adapter without support from an application server.

2. Description of the Related Art

An enterprise information system (EIS) is generally any kind of computing system that offers high quality of service that is capable of supporting some large organization while dealing with large volumes of data. EISs provide a technology platform that enables organizations to integrate and coordinate their business processes. They provide a single system that is central to the organization and ensures that information can be shared across all functional levels and management hierarchies. EISs are invaluable in eliminating the problem of information fragmentation caused by multiple information systems in an organization, by creating a standard data structure. EISs provide the information infrastructure for an enterprise such that users can expect to have fluid access to all business functions an enterprise can offer regardless of which system hosts those services and functions.

Typically, application servers or integration servers are used to access a shared EIS through an adapter. Adapters provide a mechanism that allows for the integration of existing EIS infrastructure and process integration applications. Generally, there are two types of adapters which include application adapters and technology adapters. Application adapters are designed to interface with a specific application programmable interface (API) for a specific version of an EIS. These may include adapters for SAP, Siebel, PeopleSoft, Oracle, and IBM applications. Technology adapters are designed to support a standard technology interface to any EIS that supports the same interface such as adapters for a database, file system, or web service.

In a clustered environment, multiple redundant adapters may need to access the same EIS system at the same time. Adapters typically access an EIS by polling an event table stored on the EIS. In some cases, when an adapter is processing inbound communication via polling, there is only one event table that contains the publishable information, so only one adapter can access that information at a time. If more than one adapter were attempting to operate on the same event table as may be the case when using redundant polling adapters for failover protection, competition for events would occur, resulting in invalid data being sent to the client. Conventional application servers often do not support the notion of a 'singleton' adapter to allow automatic failover. Therefore, there is a need not currently resolved in the art to allow a polling adapter to fail over to a new instance of a polling adapter even when the application server doesn't support this.

SUMMARY OF THE INVENTION

From the foregoing discussion, it should be apparent that a need exists for an apparatus, system, and method that implements failover in a polling adapter without support from an application server. Beneficially, such an apparatus, system, and method would allow a polling adapter to fail over to a new instance while at the same time preventing competition between polling adapters for access to an event table even when the application server doesn't support fail over.

The present invention has been developed in response to the present state of the art, and in particular, in response to the problems and needs in the art that have not yet been fully solved by currently available polling adapters.

The apparatus to implement failover in a polling adapter without support from an application server is provided with a plurality of modules configured to functionally execute the necessary steps of defining a group of two or more redundant servers forming a cluster, each server in electronic communication with an enterprise information system (EIS) via an associated polling adapter, the EIS comprising an event table for publishing event information and having access to a failover table shared by each adapter for determining which polling adapter is currently active and the time at which the currently active polling adapter last polled the event table; determining a priority level for each polling adapter in the group and marking the highest priority polling adapter as active in the failover table; polling the event table with the highest priority polling adapter in response to the highest priority polling adapter being marked as active; setting a last poll time in the failover table for the highest priority polling adapter each time the highest priority polling adapter completes a poll of the event table; marking a next highest priority polling adapter as active in the failover table and marking the highest priority polling adapter as inactive in response to the passage of a predetermined failover time since a last poll time of the highest priority polling adapter; and polling the event table with the next highest polling adapter and setting a last poll time in the failover table in response to the next highest priority polling adapter completing a poll of the event table.

The apparatus, in one embodiment, is further configured to re-determine a priority level for a previously highest priority polling adapter that has been marked as inactive. In yet a further embodiment, the apparatus is further configured to mark all of the polling adapters in the group as inactive in response to a crash of the entire group.

In an additional embodiment, the apparatus to implement failover in a polling adapter without support from an application server is provided with a plurality of modules configured to functionally execute the necessary steps of accessing a priority list by way of a first polling adapter and validating that a first server associated with the first polling adapter is recorded in the priority list, the priority list defining a group of two or more redundant servers each with an associated polling adapter and specifying a priority level for each of the polling adapters, each polling adapter in electronic communication with a shared enterprise information system (EIS) and a shared failover table, the EIS comprising an event table for publishing event information, the failover table comprising a server name, an active status indicator, and a last poll time for each server in the group; determining the priority level for the first polling adapter relative to the other polling adapters in the group; accessing the failover table and marking the first polling adapter as active in response to determining that the first polling adapter has the highest priority level in the priority list, polling the event table with the first polling adapter, and setting a last poll time for the first polling adapter in the failover table in response to the first polling adapter completing a poll of the event table; and accessing the failover table and determining which polling adapter is currently marked active in the failover table, polling the failover table to obtain the last poll time of the active polling adapter, marking the active polling adapter as inactive in response to determining that predetermined amount of time has been exceeded since the last poll time of the active polling adapter, marking the first polling adapter as active in response to determining that the first polling adapter has the next highest priority level, polling the event table with the first polling adapter, and setting a last poll time for the first polling adapter in the failover table in response to the polling adapter completing a poll of the event table.

In yet a further embodiment, the apparatus may be further configured to validate that the number of redundant servers in the group equals the number of servers recorded in the priority list. In one embodiment, a user may manually update the failover table in response to a crash of the entire group.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
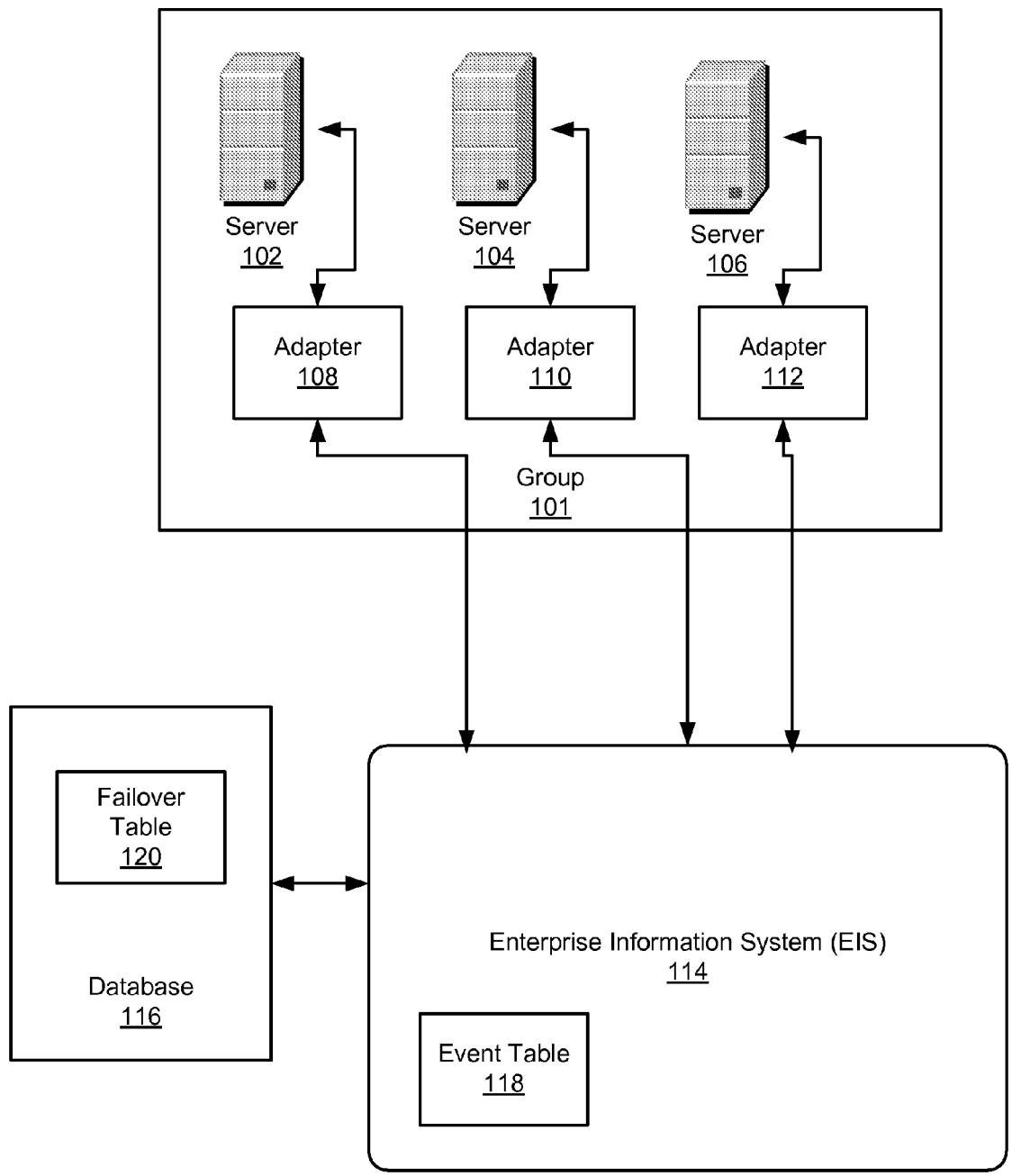
FIG. 1 is a schematic block diagram illustrating one embodiment of a system for implementing failover in a polling adapter without support from an application server in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts a schematic block diagram illustrating one embodiment of a system 100 for implementing failover in a polling adapter without support from an application server in accordance with the present invention. In one embodiment, the system 100 includes a group 101 of servers 102, 104, and 106 and associated adapters 108, 110, and 112 in electronic communication with an Enterprise Information System (EIS) 114. In one embodiment, the group 101 and EIS 114 are also in electronic communication with a database 116. In the depicted embodiment, the EIS includes an event table 118 and the database 116 includes a failover table 120.

The servers 102, 104, and 106 are preferably application servers or integration servers. An application server is a software engine that delivers applications to client computers or devices and typically handles most, if not all, of the business logic and data access of an application. An example of an application server is the WebSphere Application Server (WAS) available from IBM of Armonk, N.Y. The servers 102, 104, and 106, in one embodiment, are configured as redundant instances of one another such that if the server 102 fails, server 104 may be configured to operate in place of the failed server 102. In one embodiment, the servers 102, 104, and 106 may be server instances located on a single physical computer, and in another embodiment, the servers 102, 104, and 106 may be located on physically distinct machines.

The adapters 108, 110, and 112 are provided to allow the servers 102, 104, and 106 respectively to access the EIS 114. Generally, there are two types of adapters 102, 104, and 106 which include application adapters and technology adapters. Application adapters are designed to interface with a specific application programmable interface (API) for a specific version of an EIS. These may include adapters for SAP, Siebel, PeopleSoft, Oracle, and IBM applications. Technology adapters are designed to support a standard technology interface to any EIS that supports the same interface such as adapters for a database, file system, or web service.

As will be described in detail below, the adapters 108, 110, and 112 store a priority list as part of adapter configuration that specifies the server names 102, 104, and 106 that will participate in the cluster group 101. All adapters 108, 110, and 112 in addition to accessing the event table 118, access a failover table 120 which contains information about which adapter 108, 110, and 112 is currently active and when it last polled the event table 118. When a preconfigured time interval has occurred since the last poll of the event table 118 which may be an indication of a failure, the next adapter 108, 110, or 112 may begin processing. The detailed steps of this approach are explained below.

The EIS 114 is generally any kind of computing system that offers high quality of service that is capable of supporting some large organization while dealing with large volumes of data. Examples of an EIS 114 in accordance with the present invention may include PeopleSoft, SAP, Siebel, Oracle e-business, or JD Edwards Enterprise One.

The EIS 114 includes an event table 118 which contains publishable information that is accessible by the adapters 108, 110, and 112. The event table 118 is a means of event notification by which the adapters 108, 110, and 112 can discover the occurrence of new events in the EIS 114. Generally, the event table 118 is populated with EIS events in response to the occurrence of such events. An EIS event is typically any operation that affects the data of an EIS entity associated with a business object definition. However, the adapters 108, 110, and 112 are typically only interested in a pre-defined subset of the data-level events that create, update, delete, or otherwise affect the content of the EIS's data store. For example, a trigger may be set up on an "Employee" table that detects updates to the rows of the table. When an update occurs, the trigger inserts information about the update into the event table 118. Each new row that appears in the event table 118 represents an event notification.

The adapters 108, 110, and 112 identify new EIS events through event detection mechanisms, the most common of which is polling for new events in the event table 118. Polling behavior is configurable, including poll frequency and the maximum number of events processed per poll call. Thus, the adapters 108, 110, and 112 may be referred to in some instances as polling adapters. During the poll call, the adapter 108, 110, or 112 checks the EIS's event table 118 for changes. The interface to the event table 118 may be though the EIS 114 APIs where possible, or it may be provided through database queries to retrieve new events directly from an event table as will be recognized by one of skill in the art. The WebSphere Business Integration Adapter Framework from IBM of Armonk, N.Y. provides the technology to bind specific methods within the adapter 108, 110, and 112 to the event detection mechanism of an application. This enables a "publish and subscribe" mechanism for application events within the adapter 108, 110, or 112.

In embodiment, the database 116 includes a failover table 120. However, in other embodiments, the failover table 120 may be located in other locations accessible by the adapters 108, 110, and 112 such as within the EIS 114. The failover table 120 is preferably shared by a group 101 and typically includes a ServerName or ID, and active status indicator, and a last poll time for each server 102, 104, and 106 in the group 101. This is an example of an unpopulated failover table 120:

| Server Name or ID | Active Status Indicator | Last Poll Time |
---

Of course, the name of the failover table 120 is configurable and it is initially populated with the names of each server 102, 104, and 106 in the group 101. Initially all of the active status indicators and the last poll times are set to null. The names of the servers 102, 104, and 106 may be retrieved, in some embodiments, with function calls such as Server-Name( ).getFullName( ) or getServerId( ) which return a unique server ID that can be used to update the table. Preferably, timestamps for indicating a last poll time originate in the server 102, 104, or 106 and the servers 102, 104, and 106 have their clocks synchronized.

Figure 2:
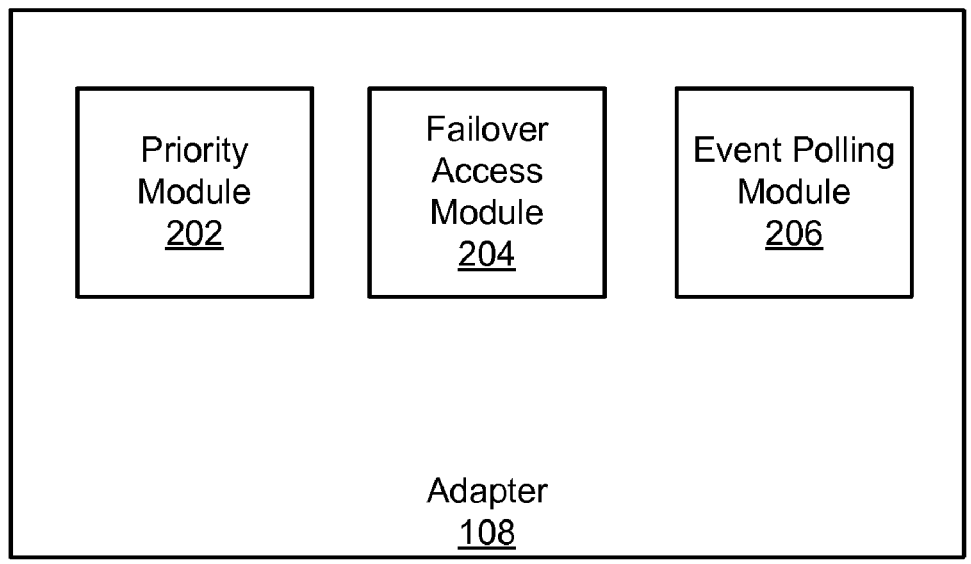
FIG. 2 is a schematic block diagram illustrating one embodiment of a polling adapter in accordance with the present invention.

FIG. 2 is a schematic block diagram illustrating one embodiment of a polling adapter 108, 110, and 112 in accordance with the present invention. In one embodiment, the adapter 108, 110, or 112 preferably includes a priority module 202, a failover access module 204, and an event polling module 206. The modules 202, 204, and 207 are configured to include the logic necessary to implement failover in the redundant polling adapters 108, 110, and 112 without support from an application server 102, 104, or 106.

The priority module 202 preferably includes a priority list for determining the priority level of each adapter 108, 110, and 112 in the group 101. Upon startup, every adapter 108, 110, and 112 validates that their server 102, 104, and 106 respectively is present in the priority list. Then the priority module 202 determines a priority level for each server 102, 104, and 106 and its associated polling adapter 108, 110, and 112.

The failover access module 204 provides the adapters 108, 110, and 112 with the logic necessary to access and poll the failover table 120. Upon startup, if the table is empty, all the adapters 108, 110, and 112 insert a record of their Server-Name or ID into the failover table 120. Preferably, in one embodiment, all the adapters 108, 110, and 112 wait until the number of records in the failover table 120 matches the number of servers 102, 104, and 106 in the group 101. The adapter 108, 110, or 112 with the highest priority in the priority list as identified by the priority module 202 will then have its active status indicator marked 'active' in the failover table 120. Only the adapter 108, 110, or 112 that is currently marked active will access and poll the event table 118 of the EIS 114. In this manner, competition between the adapters 108, 110, and 112 is avoided.

The currently active adapter 108, 110, or 112 utilizes the event polling module 206 to poll the event table 1118. Upon completion of each poll of the event table 118, the active adapter 108, 110, or 112 sets its last poll time in the failover table 120 to the current timestamp. Here is an example of the failover table 120 after startup:

| Server Name or ID | Active Status Indicator | Last Poll Time |
|---|---|---|
| Site/Svr/Org | True | 12:00:30.0000 |
| Site2/Svr/Org | Null | Null |
| Site3/Svr/Org | Null | Null |

After startup, the non-active adapters 108, 110, or 112 in the group 101 continue to use the failover access module 204 to access and poll the failover table 120. The adapters 108, 110, and 112 preferably have a pre-set failover interval.

In one embodiment, the pre-set failover interval for an adapter 108, 110, or 112 is determined by a multiplier value, the adapter's ordinal position in the priority list and the poll frequency. For example, in one embodiment, if c is the current timestamp, m is a multiplier (which is a number above 1), p is the priority of the adapter (starting at 1), and f is the poll frequency, the interval calculation could be represented as (m*p*f). Thus, the interval in which a new adapter 108, 110, or 112 may recover (failover interval) from one that's already polling may be determined by the equation: c−(m*p*f).

In various embodiments, the multiplier m may be configurable or hard-coded. Higher multiplier numbers will increase latency time, but reduce the risk of two adapters polling simultaneously, whereas low numbers will have the opposite effect. In different embodiments, the poll frequency may also be given different values to allow for such things as clock drift or the processing of a large batch of events.

During every poll cycle, each of the adapters 108, 110, and 112 preferably poll the failover table 120 via the failover access module 204. If the adapter 108, 110, or 112 is already marked 'active', it may poll the event table 118 normally. However if the adapter 108, 110, or 112 is not marked 'active', and if the currently active adapter 108, 110, or 112 has a 'last poll time' that is less than the failover interval for the inactive adapter 108, 110, or 112, then the inactive adapter 108, 110, or 112 will mark the previously active adapter 108, 110, or 112 as 'inactive' or 'null' and will then mark itself as 'active'. Then the inactive adapter 108, 110, or 112 becomes the active adapter and begins polling the event table 118 and recording its last poll time in the failover table 120 after each poll of the event table 118.

For example, if the multiplier value is 2, the poll frequency is 1000 milliseconds, and the current time stamp is 12:00:30.5000, and the adapter 108, 110, or 112 with the second highest priority computes its failover interval, the value would be 12:00:30:5000−(2*2*1000)=12:00:30.1000. Now, since the last poll time (12:00:30.0000 see Failover Table above) for the currently active adapter 108, 110, or 112 is less than this value 12:00:30.1000, the next adapter 108, 110, or 112 may mark the active adapter 108, 110, or 110 as inactive, mark itself as active, and begin polling the event table 118.

Thus, if the currently active adapter 108, 110, or 112 has a last poll time that is less than the current time minus the failover interval, this is an indication that the active adapter 108, 110, or 112 has failed and a second adapter 108, 110, or 112 should take over the processing. Furthermore, if the active adapter has a last poll time that is less than c−(m*3*pollfrequency), this means that the second adapter 108, 110, or 112 has failed and the third polling adapter 108, 110, or 112 may begin processing.

For example, the third priority adapter 108, 110, or 112 may make the computation of 12:00:30.5000−(2*3*1000)= 12:00:29.9000. But, in this example the value is less than the last poll time for the first active adapter 108, 110, or 112 (see Failover Table above) so it would not takeover in this instance. Now, if as explained above, the second adapter 108, 110, or 112 failed to start in addition to the failure of the first active adapter 108, 110, or 112, then the third adapter would come back and check the formula again at the next poll cycle and may determine that the second adapter 108, 110, or 112 has failed. In that case, the third adapter 108, 110, or 112 would take over in place of the first and second adapters 108, 110, or 112. Of course, as will be recognized by one of skill in the art, this functionality may be extended to any number of servers 102, 104, and 106 and adapters 108, 110, and 112.

In one embodiment, a supplanted adapter 108, 110, or 112 may come back online. In this case, the supplanted adapter 108, 110, or 112 would have lower failover interval than the other adapters 108, 110, or 112 (ie: m*1*pollfrequency). Thus, the supplanted adapter 108, 110, or 112 would be the next to perform failover recovery when the currently active adapter 108, 110, or 112 goes down.

In another embodiment, the failover table 120 may already be populated and the entire group 101 may be shut down and brought back up again. In this case, if the downtime is larger than the failover interval of the second highest priority adapter, competition may occur. To prevent this, a shutdown phase may be introduced. When the currently active adapter shuts down (ie: no crash), it will no longer be 'active', so it will update the failover table 120 to reflect that it is no longer active. Upon startup, the adapters 108, 110, and 112 will detect that none of the adapters 108, 110, and 112 are active, and will begin polling the failover table 120 prior to assuming the active role. Preferably, the adapter 108, 110, or 112 with the first priority position will mark itself as 'active' and resume polling of the event table 118.

In the event an entire group 101 crashes, the user may manually update the table to set the active indicator status to null for all adapters 108, 110, and 112. In one embodiment, the adapters 108, 110, and 112 may implement a 'sanity check' operation when performing failover. For instance, if the last poll time was in the past by more than c−(m*p*f+f), and the adapter 108, 110, or 112 is not the highest priority adapter 108, 110, or 112, it may wait an additional interval m*p*f before attempting to take over in order to allow the highest priority adapter 108, 110, or 112 enough time to start.

Figure 3:
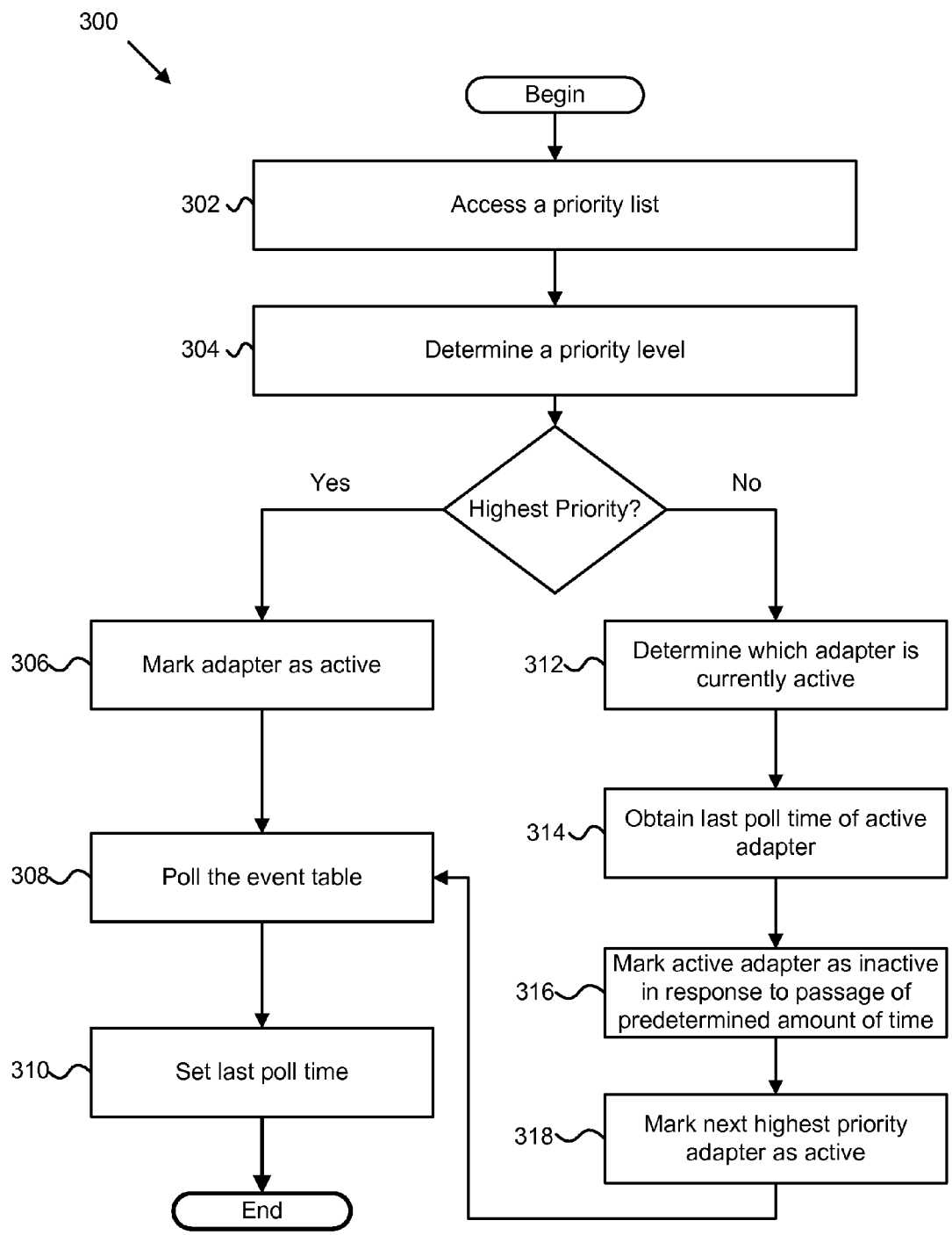
FIG. 3 is a schematic flow chart diagram illustrating one embodiment of a method for implementing failover in a polling adapter without support from an application server in accordance with the present invention.

FIG. 3 is a schematic flow chart diagram illustrating one embodiment of a method 300 for implementing failover in a polling adapter 108 without support from an application server in accordance with the present invention. The method 300 begins when a first polling adapter 108 accesses 302 a priority list by way of a priority module 202 and validates that a first server 102 associated with the first polling adapter 108 is recorded in the priority list. The list preferably defines a group 101 of two or more servers 102, 104, and 106, each with an associated polling adapter 108, 110, and 112 respectively, and defines a priority level for each of the polling adapters 108, 110, and 112 relative to one another. Each polling adapter 108, 110, and 112 is in electronic communication with a shared EIS 114 and a shared failover table 120. In one embodiment, the EIS includes an event table 118 for publishing event information and notifications. The failover table 120 preferably includes a server name, an active status indicator and a last poll time for each server 102, 104, and 106 in the group 101.

The priority module 202 determines 304 the priority level for the first polling adapter 108 relative to the other adapters 110 and 112 in the group 101.

If the first polling adapter 108 has the highest priority level in the priority list, the first polling adapter 108 marks 306 itself as active in the failover table 120. Then the first polling adapter 108 begins polling 308 the event table 118 via the event polling module 206 and sets 310 a last poll time in the failover table 120 each time it completes a poll of the event table 118.

If the first polling adapter 108 determines that it does not have the highest priority level in the priority list, then it accesses the failover table 120 by way of the failover access module 204 and determines 312 which polling adapter 110 or 112 is currently marked active in the failover table 120. Then, the first polling adapter 108 obtains 314 the last poll time of the currently active polling adapter 110 or 112. If the first polling adapter 108 determines that a predetermined amount of time (failover interval) has passed since the last poll time of the active polling adapter 110 or 112, then the first polling adapter 108 utilizes its failover access module 204 to mark 316 the active polling adapter 110 or 112 as inactive. Then, the first polling adapter 108 marks 318 itself as active if it is the next highest priority adapter 108, or in one embodiment, if no other polling adapters 110 or 112 are marked active prior to the expiration of the failover interval associated with the first polling adapter 108.

Once the first polling adapter 108 is marked active after the failure of a higher priority adapter 110 or 112, it takes over processing by polling 308 the event table 118 via its event polling module 206 and sets 310 a last poll time in the failover table 120 after each poll of the event table 118. The method 300 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable medium having computer usable program code stored on a tangible medium and executable on a processor to perform operations for implementing failover in a polling adapter without support from an application server, the operations of the computer program product comprising:

defining a group of two or more redundant servers forming a cluster, each server in electronic communication with an enterprise information system (EIS) via an associated polling adapter, the EIS comprising an event table for publishing event information and having access to a failover table shared by each adapter for determining which polling adapter is currently active and the time at which the currently active polling adapter last polled the event table;

determining a priority level for each polling adapter in the group and marking the highest priority polling adapter as active in the failover table;

polling the event table with the highest priority polling adapter in response to the highest priority polling adapter being marked as active;

setting a last poll time in the failover table for the highest priority polling adapter each time the highest priority polling adapter completes a poll of the event table;

marking a next highest priority polling adapter as active in the failover table and marking the highest priority polling adapter as inactive in response to the passage of a predetermined failover time since a last poll time of the highest priority polling adapter; and polling the event table with the next highest polling adapter and setting a last poll time in the failover table in response to the next highest priority polling adapter completing a poll of the event table.

2. The computer program product of claim 1, further configured to re-determine a priority level for a previously highest priority polling adapter that has been marked as inactive.

3. The computer program product of claim 1, further comprising marking all of the polling adapters in the group as inactive in response to a crash of the entire group.

4. A computer program product comprising a computer readable medium having computer usable program code stored on a tangible medium and executable on a processor to perform operations for implementing failover in a polling adapter without support from an application server, the operations of the computer program product comprising:

accessing a priority list by way of a first polling adapter and validating that a first server associated with the first polling adapter is recorded in the priority list, the priority list defining a group of two or more redundant servers each with an associated polling adapter and specifying a priority level for each of the polling adapters, each polling adapter in electronic communication with a shared enterprise information system (EIS) and a shared failover table, the EIS comprising an event table for publishing event information, the failover table comprising a server name, an active status indicator, and a last poll time for each server in the group;

determining the priority level for the first polling adapter relative to the other polling adapters in the group;

accessing the failover table and marking the first polling adapter as active in response to determining that the first polling adapter has the highest priority level in the priority list, polling the event table with the first polling adapter, and setting a last poll time for the first polling adapter in the failover table in response to the first polling adapter completing a poll of the event table; and accessing the failover table and determining which polling adapter is currently marked active in the failover table in response to determining that the first polling adapter does not have the highest priority level in the priority list, polling the failover table to obtain the last poll time of the active polling adapter, marking the active polling adapter as inactive in response to determining that a predetermined amount of time has been exceeded since the last poll time of the active polling adapter, marking the first polling adapter as active in response to determining that the first polling adapter has the next highest priority level, polling the event table with the first polling adapter, and setting a last poll time for the first polling adapter in the failover table in response to the polling adapter completing a poll of the event table.

5. The computer program product of claim 4, further comprising validating that the number of redundant servers in the group equals the number of servers recorded in the priority list.

6. The computer program product of claim 4, wherein a user manually updates the failover table in response to a crash of the entire group.

* * * * *